United States Patent [19]
Qian et al.

[11] Patent Number: 6,011,872
[45] Date of Patent: *Jan. 4, 2000

[54] METHOD OF GENERALIZED CONTENT-SCALABLE SHAPE REPRESENTATION AND CODING

[75] Inventors: Richard J. Qian, Vancouver; M. Ibrahim Sezan, Camas, both of Wash.

[73] Assignee: Sharp Laboratories of America, Inc., Camas, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/856,387

[22] Filed: May 14, 1997

Related U.S. Application Data

[60] Provisional application No. 60/029,726, Nov. 8, 1996, and provisional application No. 60/032,515, Dec. 20, 1996.

[51] Int. Cl.$^7$ ........................................... G06K 9/36
[52] U.S. Cl. ............................................. 382/243
[58] Field of Search ............................. 382/232, 233, 382/236, 238, 239, 241, 242, 243, 245, 246, 250, 258; 348/384, 390, 400–402, 409, 412, 413, 416, 420, 428

[56] References Cited

U.S. PATENT DOCUMENTS

| | | | |
|---|---|---|---|
| 5,214,507 | 5/1993 | Aravind et al. | 382/239 |
| 5,253,053 | 10/1993 | Chu et al. | 382/233 |
| 5,524,064 | 6/1996 | Oddou et al. | 382/180 |
| 5,577,131 | 11/1996 | Oddou | 382/173 |
| 5,579,471 | 11/1996 | Barber et al. | 395/326 |
| 5,633,685 | 5/1997 | Cho et al. | 382/242 |
| 5,675,669 | 10/1997 | Kim | 382/242 |
| 5,751,861 | 5/1998 | Astle | 382/250 |
| 5,757,971 | 5/1998 | Kim | 382/242 |
| 5,758,042 | 5/1998 | Deschuytere | 382/250 |
| 5,764,802 | 6/1998 | Simon | 382/236 |
| 5,764,808 | 6/1998 | O'Connell | 382/242 |

OTHER PUBLICATIONS

Fischler et al., Perceptual Organization and Curve Partitioning, IEEE Transactions on Pattern Analysisand Machine Intelligence, vol. PAMI–8, No. 1, pp. 100–105, Jan. 1, 1986.

Hager et al., Real–Time Tracking of Image Regions with Changes in Geometry and Illumination, Proc. Int. Conf. Computer Vision and Pattern Recognition, pp. 403–410, San Francisco, Ca, 1996.

Core Experiments on MPEG–4 Video Shape Coding, International Organisation for Standardisation: Coding of Moving Pictures and Audio Information, ISO/IEC JTC1/SC29/WG11 N1382, Nov. 11, 1996.

Qian et al., Object Detection Using Hierarchical MRF and MAP Estimation, Proc. Computer Vision and Pattern Recognition, Puerto Rico, Jun. 1997.

*Primary Examiner*—Jose L. Couso
*Attorney, Agent, or Firm*—Robert D. Varitz, PC

[57] ABSTRACT

A method for content-scalable shape representation is described. In content-scalable shape representation, the more important parts of the image are encoded using a larger number of bits within a single hierarchical layer, or within one or more layers of multiple hierarchical layers. This representation may be used with the framework of a hierarchical vertex-based shape representation technique. The method described herein provides for the representation of shapes either by selected verticles along a contour, or by binary bit maps. The resulting representation facilitates content-scalable coding.

10 Claims, 5 Drawing Sheets

METHOD OF GENERALIZED CONTENT-SCALABLE SHAPE REPRESENTATION AND CODING

RELATED APPLICATION

This application is a related to application Ser. No. 08/825,646, filed Apr. 3, 1997, for VERTEX-BASED HIERARCHICAL SHAPE REPRESENTATION AND CODING METHOD AND APPARATUS, the specification of which is incorporated herein by reference.

FIELD OF THE INVENTION

This invention relates to the representation and coding of contour of arbitrarily shaped image objects, primarily of video image objects, wherein different portions of a predetermined shape may be coded at varying quality, or fidelity, levels, depending upon the content of the shape.

BACKGROUND OF THE INVENTION

Content-based coding and manipulation of video is one of the core functionalities supported by the emerging international Moving Picture Experts Group (MPEG), standard for coding audiovisual signals, and specifically, the MPEG4 standard. This functionality requires representation and coding of contour and texture of arbitrarily shaped image objects.

Known methods of shape recognition include methods such as that used in the WebSEEk program, which searches a collection of computer files containing image and video data by file type, i.e., GIF, MPEG, and text references. The system then decompresses the files, analyses the contents of the files for colors and/or texture. An icon is formed which includes a miniature version of the image, which icons may be examined for specific types of images.

Another shape recognition program is known as Query by Image Content (QBIC), which is an IBM® product. QBIC examines an image file for color, contrast, coarseness and directionallity. Only limited shape information is made available during image analysis, and the image is analyzed as a whole. The known methods are quite slow, are resource intensive, and do not readily enable searching by shape criteria. The method of the invention are intended to overcome these limitations.

In the MPEG4 document, in effect as of the filing date of this application, block-based, spatial-resolution scalable shape coding was implemented using a shape pyramid in the MPEG4-Shape Coding Core Experiments (SCCE). Given a binary bit map representation and image object shape, a three-layer shape pyramid is formed for each macro-block. This technique is explained in connection with FIG. 1 herein. The shape pyramid 10 includes, in this representation, three layers. The base (coarsest) layer (Layer 0) 12 is formed by averaging a window of 4×4 pixels, and thresholding the result in order to clip it to either 0 or 1. The resulting block is 4×4. The next layer (Layer 1) 14 is formed by repeating this process using a window of 2×2 pixels, resulting in a finer resolution layer of 8×8 blocks. The finest layer (Layer 2) 16 has the original macroblock resolution. Macroblocks in the base layer are coded by themselves. Macroblocks in Layer 1 are coded differentially in reference to macroblocks in Layer 0. That is, macroblocks in the base layer are upsampled and their difference (residual) from co-located macroblocks of Layer 1 are coded. Similarly, Layer 2 is coded differentially in reference to Layer 1 and so on. Residually coded layers (Layer 1, 2, . . . ) are referred to as "enhancement layers." Coding the macroblock and residual macroblock data may be performed in various efficient ways. Two methods were proposed in MPEG4. The known methods, however, sample a layer or an image at the same resolution over the entire layer or image. Some parts of an image are more important than others, and warrant a higher resolution. Hierarchical shape pyramid has been discussed in MPEG4 for use with spatial scalability, but has not been discussed in connection with content scalability.

SUMMARY OF THE INVENTION

Content-scalable shape coding allows a part of a shape contour, corresponding to a visually salient (more important) feature, to be represented and coded with higher fidelity than its remaining parts. For instance, the part of the contour associated with the face of an image object containing the head and upper body of a human subject may be allocated a larger number of bits than the remaining parts of the contour. This strategy, based on the premise that the facial region of a taking human subject is more important than the rest of the body, results in increased visual quality in situations where the bit budget is limited. Essentially, more bits are spent to encode parts of the contour that are visually more important. Content-scalable shape coding also facilitates error resilience when the bits corresponding to the most important part of the contour are tightly protected in a noisy channel environment.

In this disclosure, a method for content-scalable shape representation is described. In content-scalable shape representation, the more important parts of the image are encoded using a larger number of bits within a single hierarchical layer, or within one or more layers of multiple hierarchical layers. This representation may be used with the framework of the hierarchical vertex-based shape representation technique described herein and in the related application, cited above. The method described herein provides for the representation of shapes either by selected vertices along a contour, or by binary bit maps. The resulting representation facilitates content-scalable coding.

It is an object of this invention to provide a method of content-scalable shape representation that will represent visually more important features of an image using relatively high fidelity encoding.

Another object of the invention is to allow the representation of an important segment of a video image with a greater number of bits in a bitmap, or with a greater number of bits in a hierarchical layer.

These and other objects and advantages of the invention will become more full apparent as the description which follows is read in conjunction with the drawings.

DETAILED DESCRIPTION OF THE PREFERRED EMBODIMENTS

The method described herein is a method of generalized content-scalable shape representation and coding, which may be used with a vertex-based, hierarchical shape representation and coding technique, described in our above-cited co-pending application, or with a bit-mapped image. In the vertex-based method, the same resolution is used across an entire layer representing an image object of interest. In the method described herein, a higher fidelity, i.e., a greater number of bits, is used to represent important segments of the image object. This higher fidelity technique may be used with a bitmap, wherein the image is contained in a single "layer," or in conjunction with the hierarchical shape representation technique.

Content-Based Scalable Shape Coding

A hierarchical vertex representation, as described in our co-pending application, cited above, allows a decoder to reconstruct a contour at different accuracy by decoding parts of the bit stream, which is called "quality scalability." A decoder may decide on the number of layers of vertices that needs to be used in the reconstruction of a contour to achieve a certain accuracy. For instance, for best possible representation using the least number of vertices, the decoder may choose to decode only the vertices at the base level, i.e., the most salient vertices. For higher accuracy, vertices belonging to less salient levels need to be decoded as well.

A decoder may make this decision in consideration of the available display resolution, for example. A relationship between a saliency parameter $D_{max}$ and the display resolution may be defined to implement spatially scalable shape coding. Because a high resolution display usually reveals more details of a shape, the decoder may decide to use more layers of vertices for such a device. To use more layers of vertices means to include layers of vertices associated with smaller $D_{max}$'s. Therefore, one may define the relationship between the saliency parameter $D_{max}$ and the display resolution such that, as the resolution increases, lower values of $D_{max}$ are required in order to include more layers of vertices.

In a spatially-scalable coding application, the decoder reconstructs a spatially lower resolution of the video objects, and hence a spatially lower resolution of the video images. In other words, the texture and shape is reconstructed at a lower spatial resolution. In a spatially-scalable coding, the decoder may use the base layer vertices in reconstructing the object shape at lowest spatial resolution; the coordinates of the vertices are scaled down by M, where M denotes the factor of spatial resolution reduction in both horizontal and vertical dimensions. For instance, M can be 2, 4, or any integer.

Content-scalable shape coding is achieved by representing important parts of the contour by a greater number of layers. Important parts of the contour are those parts that surround important parts of the objects, such as the face of a human subject.

Figure 2:
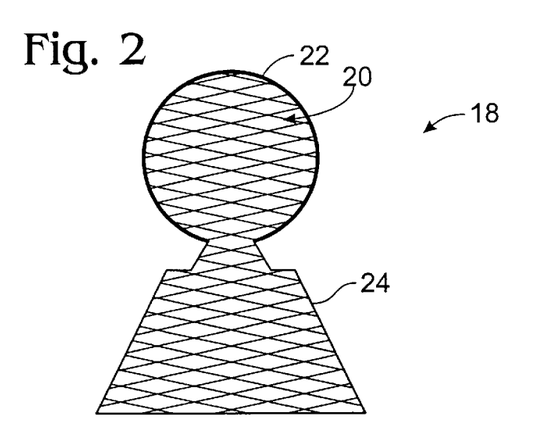
FIG. 2 depicts an image region and a contour about an important part of the image.

Referring now to FIG. 2, the process of defining the important part of a shape contour will be described. Shape representation is used in object-based image and video compression where image or video objects (VO) are coded separately from other objects. Video is analyzed into video objects, which objects are described by their shape, texture and motion. An object based encoder and decoder are provided. The shape encoder encodes a particular representation of the shape, e.g., a vertex-based representation, or a binary shape bitmap based representation. Vertex-based shape representation uses a subset of points along the shape contour. A binary image, with value "1" within the spatial region occupied by the object and "0" otherwise, is the binary bitmap representation of the shape.

As shown in FIG. 2, an image object 18 may have a salient subregion 20 (e.g., face region) that may be of visual importance, as represented by the heavy line 22. In content-scalable coding, the part of the contour describing the shape of the object, that surrounds this important region, may be represented by a larger number vertices than the remaining parts 24 of the contour that are relatively less important. This may be achieved by using one or both of the following mechanisms: (i) the contour surrounding the important region may be represented by a larger number of hierarchical layers; (ii) smaller valued control parameters, $D_{max}$, may be used for parts of the contour surrounding the important regions. Vertices selected using larger $D_{max}$ tend to capture more significant characteristics of the contour while those with smaller $D_{max}$ tend to capture more subtlety of the contour. The first mechanism (i), is more suited to a situation where the are multiple layers of vertices to be coded; the second mechanism, (ii), is best suited to a situation where a single layer of vertices is present.

Assume that the video image of interest is segmented into objects. Such a segmentation map may be available if the video were generated using blue-screen techniques. Otherwise, it may be automatically determined using various segmentation algorithms or manually constructed by the user.

The important sub-regions of image objects may be either determined manually by the user or by an automatic algorithm, e.g., by an automatic face detection algorithm, as described by R. J. Qian, T. S. Huang, "Object Detection Using Hierarchical MRF at MAP Estimation," Proc. Computer Vision and Pattern Recognition, Puerto Rico, June 1997. The important segments of an object contour, the contour of interest, is represented by $B_u$, where the contour C is expressed as the union $C = \cup B_u$. The number of hierarchy layers is chosen for each segment depending on the importance of the object sub-region that it surrounds; we denote the number of layers by L(u). If $B_{u'}$ is the most important part of the contour, then $L(u) \leq L(u')=L$. The parameter $D_{max}$, which is a function of L, is also a function of the segment of the contour. We express this dependence by $D_{max}[L,u]$.

Figure 3:
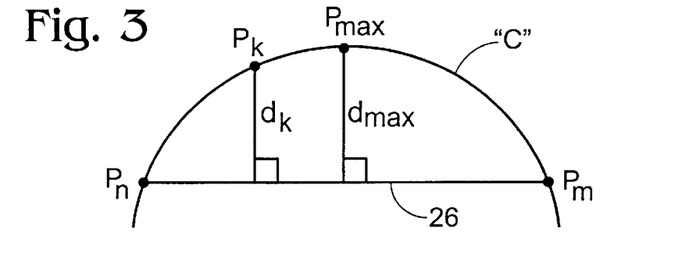
FIG. 3 is a depiction of a step in the shape representation method of the invention.

The points on a contour C, line "C" in FIG. 3, are ordered as $P_0, P_1, \ldots, P_{N-1}$. The extracted vertices will be called $S_0[j], S_1[j], \ldots, S_{M(j)-1}[j]$, where j denotes the jth layer and M(j) is the number of vertices. The three major steps of the content-scalable method are as follows:

Step 1: Initialization.
- (1a) Select the total number of layers for each segment: L(u). (This may be done by the user depending on the relative importance of the contour segments.)
- (1b) Select the saliency parameter (a predetermined saliency parameter) for each layer and for each segment; record each predetermined saliency parameter in an array called $D_{max}[L,u]$.

Step 2: Extract salient points in layer 0 (the most salient layer that exists for all segments $B_u$). (Refer now to FIG. 3)
- (2a) Start from any point, i.e., $P_n$. Form a straight line 26 between $P_n$ and $P_m$, where $P_m = P_{n+2}$. Compute the distance $d_k$ between each contour point $P_k$, where n<k<m, and straight line 26. Choose the largest distance $d_{max}$ from $d_k$, also where n<k<m. If $d_{max} \geq D_{max}[0,u]$, record $P_{max}$ as a salient point at layer 1, i.e., $S_0[0]$, then go to step 2b. If $d_{max} < D_{max}[0,u]$, move $P_m$ to its next contour point, i.e., $P_m = P_{m+1}$ and repeat the above process until a salient point is found.

(2b) Use $S_0[0]$ as a start point as $P_n$, in step 2a and repeat the process in step 2a until the next salient point $S_1[0]$ is found. Then use $S_1[0]$ as a start point and repeat the process until the next salient point is found, or the process searches back to $S_0[0]$. Go to Step 3.

Step 3: Extract salient points in layer j>0.

(3a) Within the contour segment between each pair of adjacent salient points in the previous layer, ie., $S_i[j-1]$ and $S_{i+1}[j-1]$, repeat the salient point extraction process as in Step 2, but using $D_{max}[j,u]$. Extract salient points at this layer, j>0, over the segment $B_u$, provided that j<L(u). Record the extracted salient points that satisfy this constraint as $S_0[j], S_2[j], \ldots, S_{M(j)-1}[j]$.

(3b) Repeat step 3a until j=L−1, where L is the maximum value of L(u). Then stop.

There is, in general more than one image object in the scene, and the above process may be applied to each image object sequentially. Some objects, as a whole, may be more important than others. If that is the case, the parameters of vertex selection (layer numbers and the saliency parameters) may be adjusted accordingly from one object to another.

Figure 4:
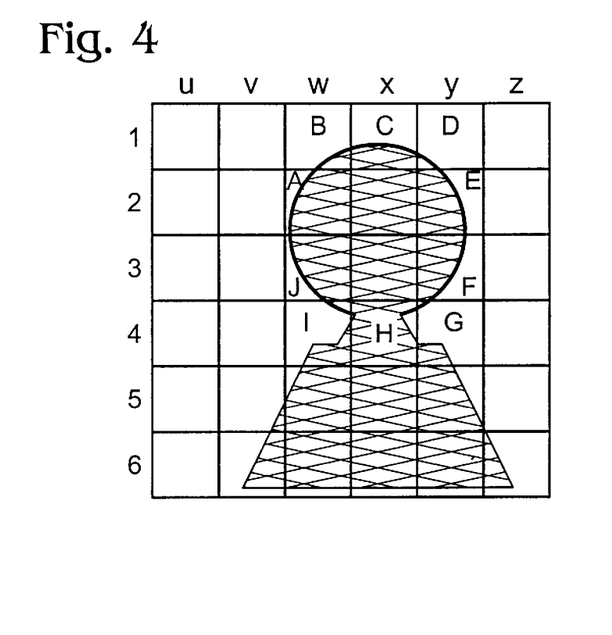
FIG. 4 depicts an array of macroblocks containing an important part of the image of FIG. 2.

Another embodiment uses binary bitmap based shape representation. Referring now to FIG. 4, the bitmap of FIG. 2 is divided into contiguous blocks, and coded block by block, as considered in MPEG4-SCCE standardization as it exists at this time. The blocks, U1 to U6 to Z6, which are 16×16 pixel blocks, are called macroblocks. In FIG. 4, macroblocks containing important parts of the contour are denoted by letters A through J, i.e., block W2 is designated as "A."

Returning now to FIG. 1, in the MPEG4 document block based spatial-resolution scalable shape coding was implemented using a shape pyramid as described in the MPEG4-SCCE. A three layer, hierarchical pyramid 10 is formed for each macroblock. The base (coarsest) layer (Layer 0), 12, is formed by averaging a window of 4×4 pixels, and thresholding the result in order to clip it to either 0 or 1. The resulting block is 4×4. The next layer (Layer 1), 14, is formed by repeating this process using a window of 2×2 pixels, resulting in 8×8 blocks. The finest layer 16 has the original macroblock resolution. Macroblocks in the base layer are coded by themselves. Macroblocks in Layer 1 are coded differentially in reference to macroblocks in Layer 0. That is, macroblocks in the base layer are upsampled and their difference (residual) from co-located macroblocks of Layer 1 are coded. Similarly, Layer 2 is coded differentially in reference to Layer 1 and so on. Residually coded layers (Layer 1, 2, . . . ) are referred to enhancement layers. Coding the macroblock and residual macroblock data may be performed in various efficient ways. Two methods were proposed in MPEG4.

In the MPEG4 scheme for spatial resolution scalability, every macroblock is coded using N=3 layers of hierarchy. An important feature of our invention is to realize content-scalability using variable number of scalability layers to represent each macroblock, i.e., only those macroblocks containing the important parts of the contour (denoted by letters A to J in FIG. 4) are coded using all the N layers in the hierarchy. Besides content scalability, the method described herein also extends the spatial-resolution scalability proposed in the MPEG4 document to a "smarter" spatial scalability where compression efficiency is increased since additional layers do not need to be coded for unimportant macroblocks. The accuracy of shape representation as well as the bit consumption increases with the number of hierarchy layers.

Figure 5:
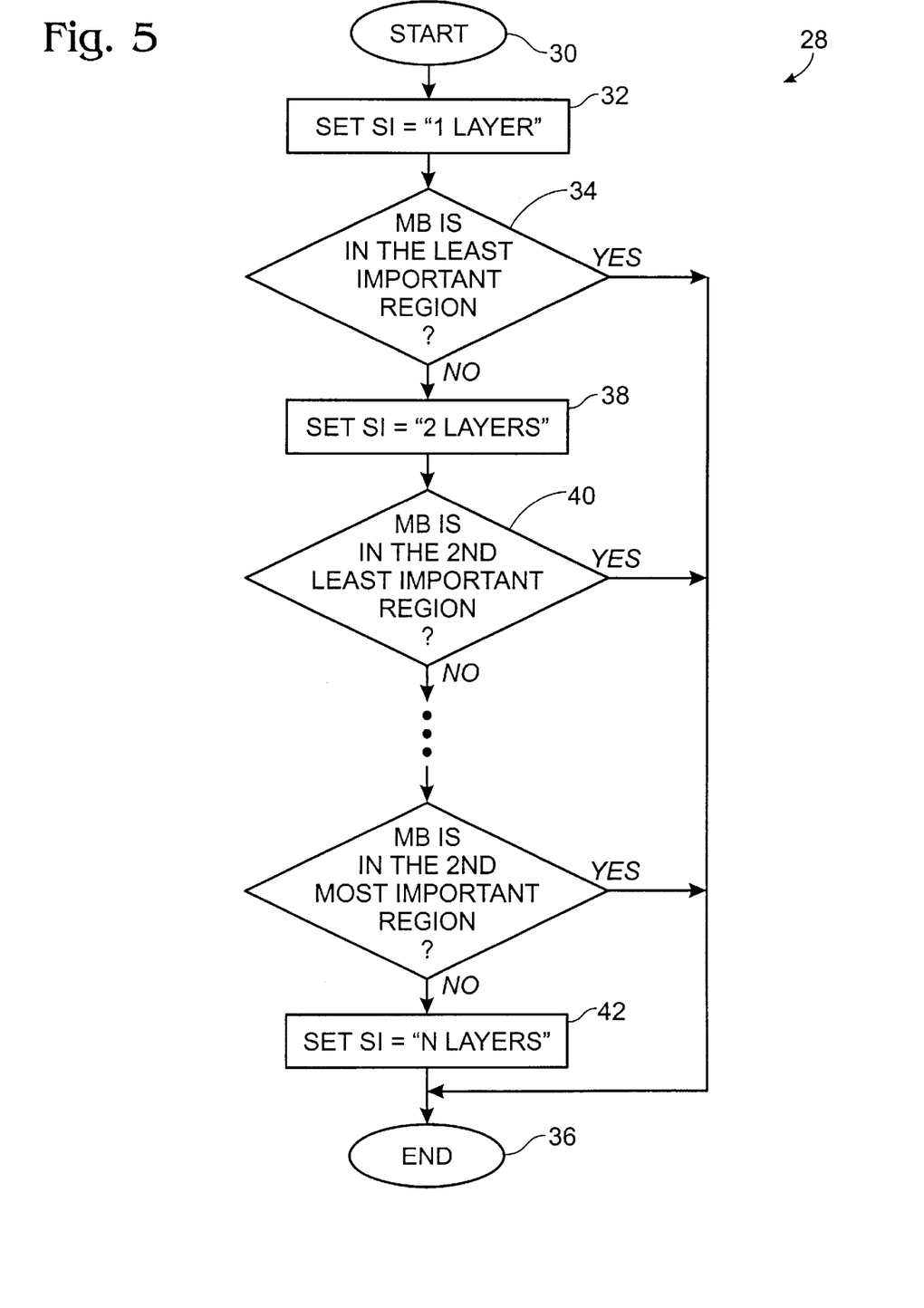
FIG. 5 is a block diagram of a decision mechanism to determine the number of scalability layers for each macroblock.

The number of layers required for each macroblock may be determined on the basis of content importance as shown in FIG. 5, where up to N layers of hierarchy is assumed.

Figure 1:
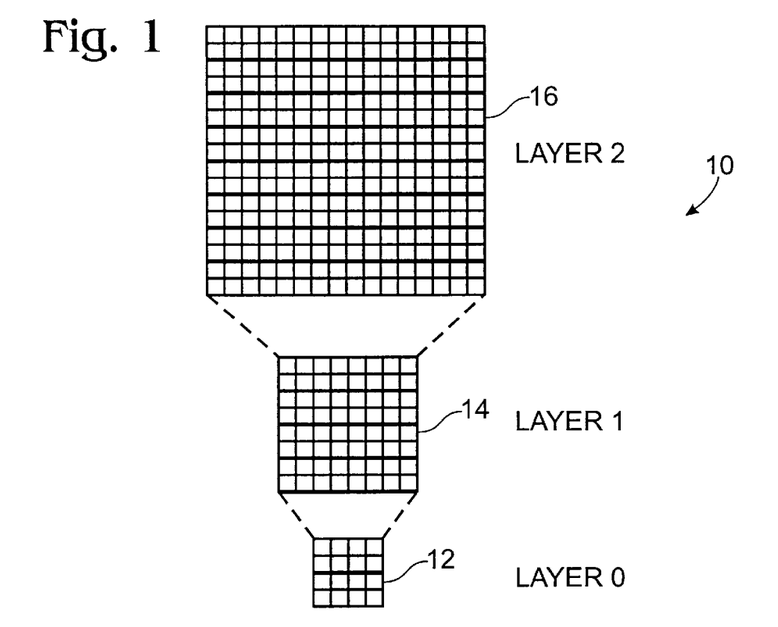
FIG. 1 depicts a macroblock array and a 3-layer pyramid representation thereof.

The bitstream corresponding to macroblocks in the base layer and residual macroblocks in the enhancement layers may be placed separately in the entire bitstream to provide bit-stream scalability. For instance, all Layer 0 macroblock data is placed in one bitstream and enhancement layers (if any) are placed in separate bitstreams, as depicted in FIG. 1.

Referring now to FIG. 5, a first decision mechanism to determine the number of scalability layers for each macroblock on the basis of its importance is shown generally at 28. Macroblocks in the most important region are coded with N layers. Parameter SI, the scalability indicator, denotes the number of hierarchy levels. Decision mechanism 28 starts at block 30. The number of the layer of the hierarchy is set, block 32. Mechanism 28 determines whether the macroblock (MB) is in the least important region, block 34, and if so, goes to the end, block 36. If the MB is not in the least important region, SI is incremented by 1, block 38, and the determination is repeated, block 40, until such time as SI=N, block 42.

Figure 6:
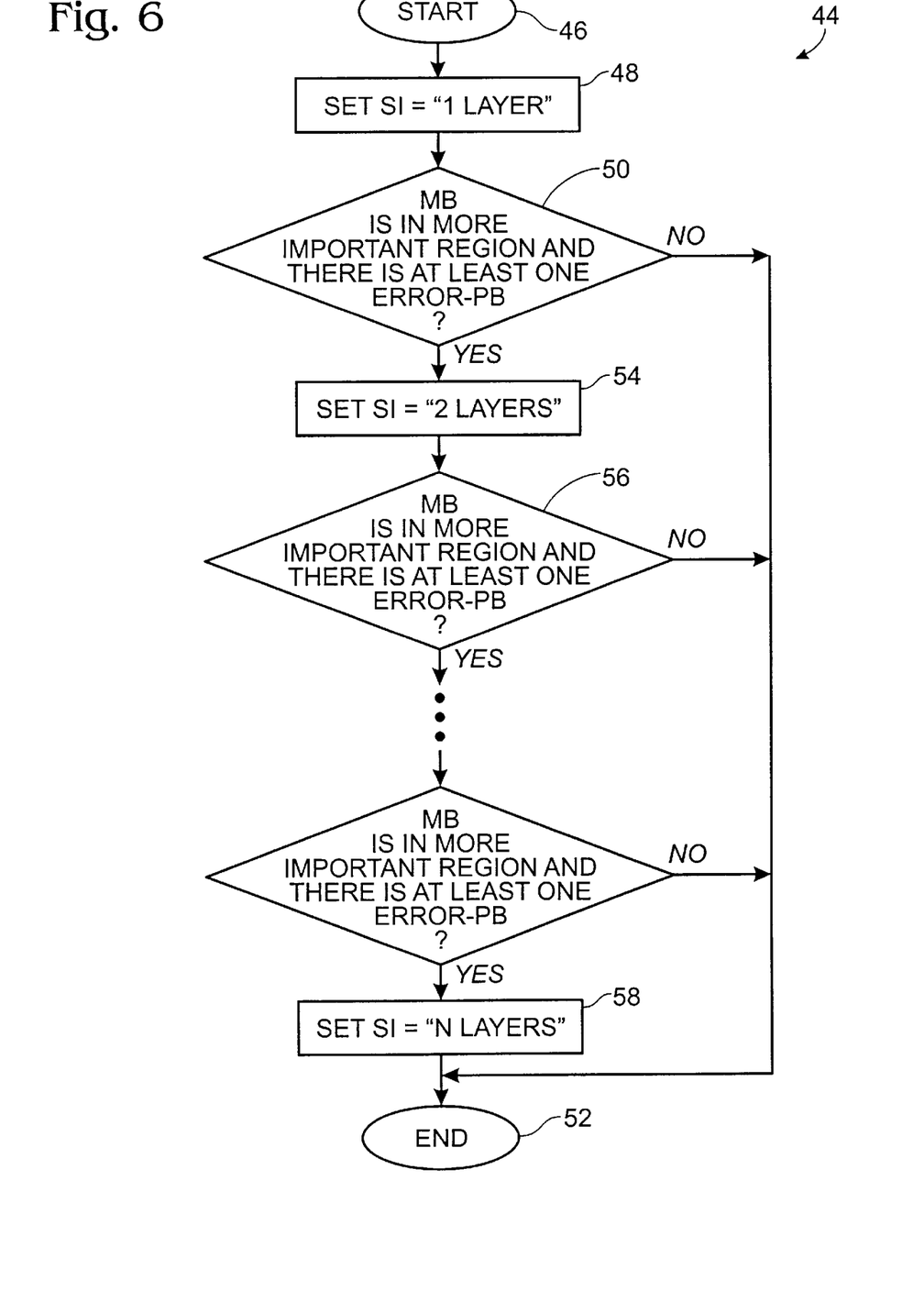
FIG. 6 is a block diagram of a variation of the decision mechanism decision mechanism to determine the number of scalability layers for each macroblock.

FIG. 6 depicts a second decision mechanism 44, which starts at block 46, sets SI="1 layer", block 48, and wherein the determining factor is whether the MB is in a more important region and there is at least one Error-PB, block 50. ("PB" is a short-hand representation for a 4×4 pixel block) If the answer is "no," the mechanism proceeds to end block 52. If the answer is "yes," SI is incremented by 1, block 54, and the next decision block 56 tests the conditions. Again, this is repeated until SI=N layers, block 58.

Figure 7:
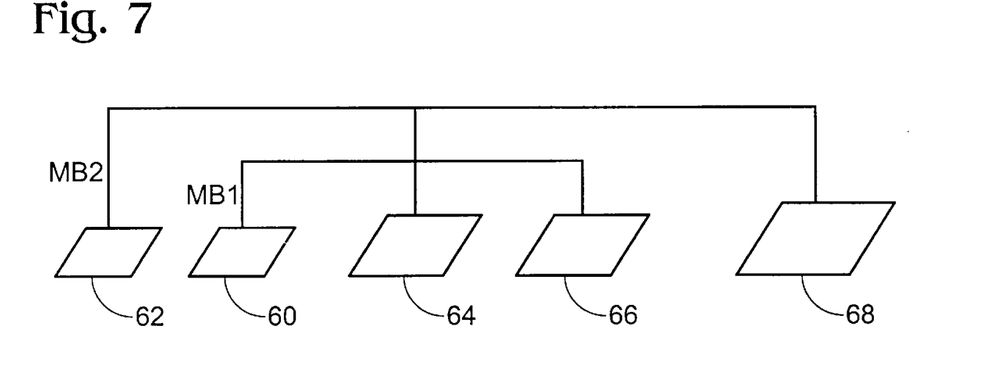
FIG. 7 is a block diagram depicting macroblocks for various hierarchical layers.

As shown in FIG. 7, a macroblock 1 (MB1) 60 contains a lesser important part of the contour than macroblock 2 (MB2) 62 since MB1 is represented and coded using only 2 layers, blocks 60 and 66. MB2 is represented and coded using three layers, blocks 62, 64 and 68, where block 62 is the lowest layer, block 64 is the middle layer and block 66 is the upper layer. In the bitstream, macroblocks of the base layer and the enhancement layers are stored in separate layers. The decoder may only decode the base layer macroblocks to reconstruct the shape at lowest quality. Then, with decoding of additional enhancement layers, important parts of the shape are improved in quality.

In general, a shape pyramid with an arbitrary number of resolution layers may be used in realizing content scalability. For instance, in the case of two layers, the coarsest (base) layer may be obtained by sub-sampling the bitmap by a factor of 2 in both directions. Furthermore, lossless coding of shape may also be achieved by adding an additional layer where the coding error at the highest resolution is encoded in a lossless manner.

Content scalability may be realized using any type of multi-resolution shape representation. An alternative multi-resolution representation of a shape bitmap for realizing content scalabiiity is obtained using the scan interleaving representation specified in MPEG4-SCCE. In scan interleaving, the bitmap is first sub-sampled by a factor of 2 only in the horizontal (vertical) direction. The sub-sampled pixels are predictively coded in reference to the remaining pixels. The next coarser layer is created by sub-sampling the resulting bitmap by a factor of 2 in the vertical (horizontal)

direction. The sub-sampled pixels are predictively coded in reference to the remaining pixels. This layer is predictively coded in reference to the bit map obtained by sub-sampling by a factor of 2 in both directions, and coded by a bit map-based shape coding method. In this scheme, content scalable shape coding may be achieved by coding the base layer and then coding the two additional layers for only those pixels belonging to a rectangular area containing the most important part of the shape bit map.

The method of the invention facilitates content-scalable shape coding. Contours surrounding important sub regions of an image object will be coded with larger number of bits. In the case of a fixed bit budget, this will result in increased quality of important sub-regions at the expense of relatively less important sub-regions of an object.

Important sub-regions, such as faces, may be detected automatically at each frame of the video sequence, or detected at the first frame and motion-tracked subsequently through the sequence using techniques such described by Qian, cited above, and Hager & Belhumuer, "Real-Time Tracking of Image Regions with Changes in Geometry and Illumination," Proc. Int. Conf. Computer Vision and Pattern Recognition, pp. 403–410, San Francisco, Calif., 1996, respectively.

Content-Scalable Shape Coding Based on the IMMR Method

Shape pyramids may be used to provide spatial scalability to the Improved Modified Mean Replacement (IMMR) method, as described in International Organisation for Standardization, "*Core Experiments on MPEG4 Video Shape Coding,*" Document ISO/IEC JTC1/SC29/WG11 N1382, November, 1996, hereinafter, the "ISO Document." In practicing one way in which to implement this idea, a variable called scalability-indicator (SI) is defined for each macroblock in a video object plane (VOP). The variable SI stores the information of how many layers of the shape pyramid are coded for the corresponding MB. SI has values such as "1 layer", "2 layers", etc. The value "1 layer", for example, indicates that there is only one layer coded for the MB and the layer has the lowest resolution. Similarly, "N layers" indicates that there are N layers coded for the MB and they correspond to N different resolutions ranging from the lowest to the Nth highest resolution. The conversion-ratio (CR) in the IMMR syntax should be replaced with SI. This results in a modified syntax which is bit-wise compatible with the existing IMMR syntax and has the following structures:

TABLE 1

Structure of macroblock layer in I- and P-VOPs

| 1st_shape_mode | COD | MCBPC | Acpred_flag | CBPY | DQUANT | | |
|---|---|---|---|---|---|---|---|
| 2nd_shape_mode | MVDs | SI | ST | VLC_binary | Vpass | RLB/ULB | |
| MVD | MVD2 | MVD3 | MVD4 | | | | |
| CODA | CBPA | Alpha Block Data | Block Data | | | | |

TABLE 2

Structure of macroblock layer in B-VOPs

| 1st_shape_mode | MODB | MBTYPE | CBPB | DQUANT | | |
|---|---|---|---|---|---|---|
| 2nd_shape_mode | MVDs | SI | ST | VLC_binary | Vpass | RLB/ULB |
| MVDf | MVDb | MVDB | | | | |
| CODA | MODBA | CBPBA | Alpha Block Data | Block Data | | |

SI may be coded using the entropy coding methods. For an implementation which uses 3-layer shape pyramids, the following Variable Length Code (VLC) table may be used for coding SI.

TABLE 3

VLC

| SI | Code |
|---|---|
| 1 layer | 0 |
| 2 layers | 10 |
| 3 layers | 11 |

In Table 3, "1 layer" indicates that there is only one layer coded for the MB and the layer has the lowest resolution, which corresponds to CR=¼ in this case. Similarly, "2 layers" indicates that there are two layers coded for the MB and their resolutions are CR=¼ and CR=½. Finally, "3 layers" indicates that there are three layers coded and their resolutions are CR=¼, CR=½ and CR=1.

Content scalability may be added to the IMMR method by using the above SI-enabled syntax and an SI determination algorithm depicted in FIGS. 5 or 6. Depending on the ranks, in terms of importance, of the different parts of a shape contour, their corresponding MBs may be coded using different number of layers. The greater the number of layers, the higher the resolution, therefore the better the quality of shape representation. FIGS. 5 and 6 represent an SI determination algorithm for content scalable shape coding. The methods for coding the different layers based on the IMMR method are described in the ISO Document.

When an MB uses more than one layer, the IMMR codes for its different layers may be cascaded together in the order of ascending resolutions.

Content-Scalable Shape Coding Based on the Context-based Arithmetic Encoding (CAE) Method An alternate method of coding may be used to implement spatial scalability and to add content scalability to the block-based CAE method. The variable SI is employed again in this case and is added to the CAE syntax listed in the cited ISO document. The modified CAE syntax have the following structures:

TABLE 4

Structure of Macroblock Layer in I- and P-VOPs

| alpha_block_mode | SI | MVDα | alpha_block_code | | | | |
|---|---|---|---|---|---|---|---|
| COD | MCBPC | CBPY | DQUANT | MVD | MVD2 | MVD3 | MVD4 |
| CODA | CBPA | Alpha Block Data | Block Data | | | | |

TABLE 5

Structure of Macroblock Layer in B-VOPs

| alpha_block_mode | SI | MVDa | alpha_block_code | | | |
|---|---|---|---|---|---|---|
| MODB | MBTYPE | CBPB | DQUANT | MVDf | MVDb | MVDB |
| CODA | MODBA | CBPBA | Alpha Block Data | Block Data | | |

Again, SI may be coded using the entropy coding methods. For an implementation which uses 3-layer shape pyramids, as shown in Table 3, may be applied.

For content scalability, the SI determination algorithm in FIGS. 5 or 6 may be used for the block-based CAE method. The methods for coding the different layers based on the CAE method are described in the cited ISO document. When an MB uses more than one layer, the CAE codes for its different layers may be cascaded together in the order of ascending resolutions.

Content-Scalable Shape Coding Based on the Baseline Method

For the block-based Baseline method described in the previously cited ISO document, the IMMR and CAE methods may be used to implement spatial scalability and to add content scalability. Again, the "CR" term in the mb_layer( ) syntax described in the ISO document is replaced with SI as previously defined. The modified syntax is bit-wise compatible with the existing syntax of the block-based Baseline method and listed as follows.

TABLE 6

```
mb_layer(number_of_macroblock)
{
    mb_type                                                    vlc
    if  (mb_type != OPAQUE || mb_type != TRANSPARENT)
    SI                                                         vlc
    if  (mb_type == INTER) {
        y_dir_motion                                           vlc
        x_dir_motion                                           vlc
        number_of_macroblock ++
    }
    else if (mb_type == INTRA || mb_type == MB_DELAY) {
        mb_shape_layer()
        if  (mb_type != MB_DELAY)
            number_of_macroblock ++
    }
}
```

SI may be coded using the entropy coding methods. For an implementation which uses 3-layer shape pyramids, the Table 3 VLC values may be applied.

For content scalability, the SI determination algorithm in FIGS. 5 or 6 may be used for the block-based Baseline method. The methods for coding the different layers based on the Baseline method are described in the ISO document. When an MB uses more than one layer, the Baseline codes for its different layers may be cascaded together in the order of ascending resolutions.

A content-based image and video database may use shape directly as one of the features representing the image content, especially when a shape is a major discriminator among database objects. In such a case, shape may be represented using multiple layers of hierarchy. Fast browsing may be performed on the basis of shape alone, where shape may be progressively refined as needed during browsing. When it is determined that the shape belongs to the desired object(s), the shape and associated texture may be reconstructed at their highest accuracy for presenting the object to the user. In such a database, texture may or may not be represented in a hierarchical manner. In the latter case, texture representation may be associated with the highest quality version of the shape. In such a case, similarity measures, matching criteria may also be executed in a hierarchical manner. For instance, a matching score may be first calculated using the most salient vertices. Further consideration may be based on whether there is a match at this lower level.

Vertex-Based Hierarchical Shape Representation

Figure 8:
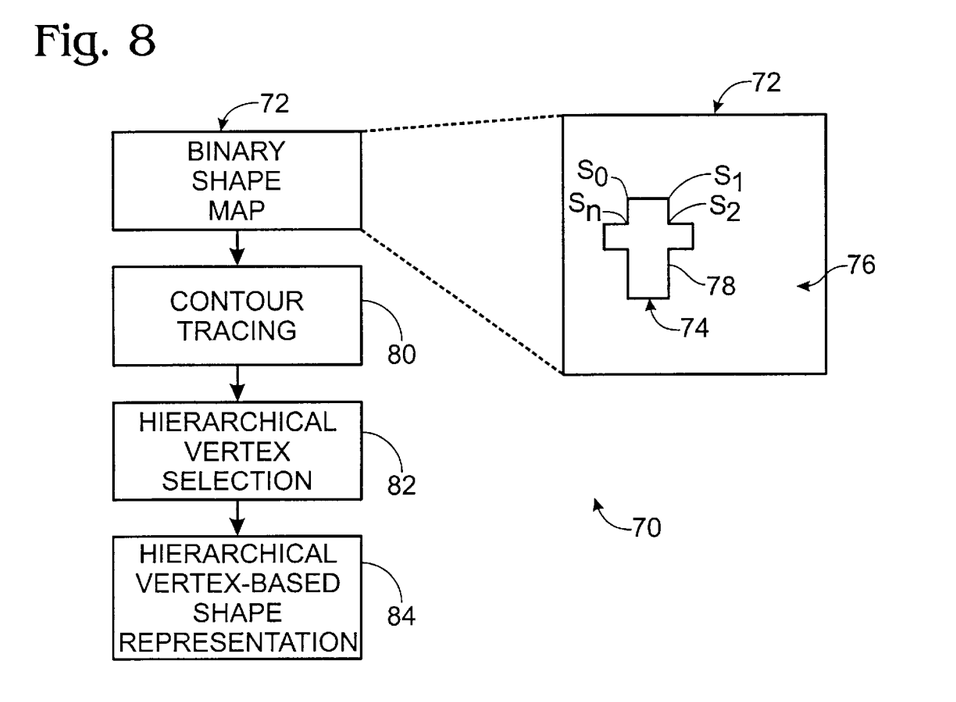
FIG. 8 is a block diagram depicting a vertex-based, hierarchical shape representation method.

In this embodiment, fully described in our co-pending application, cited above, shape is represented via vertices, i.e., points on the shape contour. Such representation is referred to as vertex-based shape representation. FIG. 8 depicts the major steps of determining a vertex-based hierarchical shape representation, generally at 70, and an image of interest at 72. Shape may be initially represented by a binary shape map where the gray levels corresponding to the video object (VO) 74 of interest is assigned the value of "1" and the remainder 76 of the video image is set to "0". A boundary 78 is established between object 74 and remainder 76. A contour tracing step 80 determines the coordinates of all the pixels, or contour points, that are on boundary 78 of the object of interest 74. Representative vertices, $S_0$, $S_1$, $S_2$ ... $S_n$, are selected from this set of contour points. The next two steps include hierarchical vertex selection 82 and hierarchical vertex-based shape representation 84.

The hierarchy, as used herein, is defined in terms of "visual saliency," i.e., significance of a set of vertex points in representing the contour of a video object. At the base hierarchy layer, layer "0", the most salient vertex points are determined, which vertex points capture the most salient features of the shape of the object of interest. At subsequent layers, points of lesser saliency are determined. The set of all vertex points determined at all layers form a hierarchical representation of the contour of the video object in question. Vertex points belonging to different layers reflect different visual saliency. The vertices belonging to the base layer may be used to represent the contour with the least possible number of vertices that are salient. Vertices of subsequent layers may be incrementally added to obtain a representation with increased accuracy.

Figure 9:
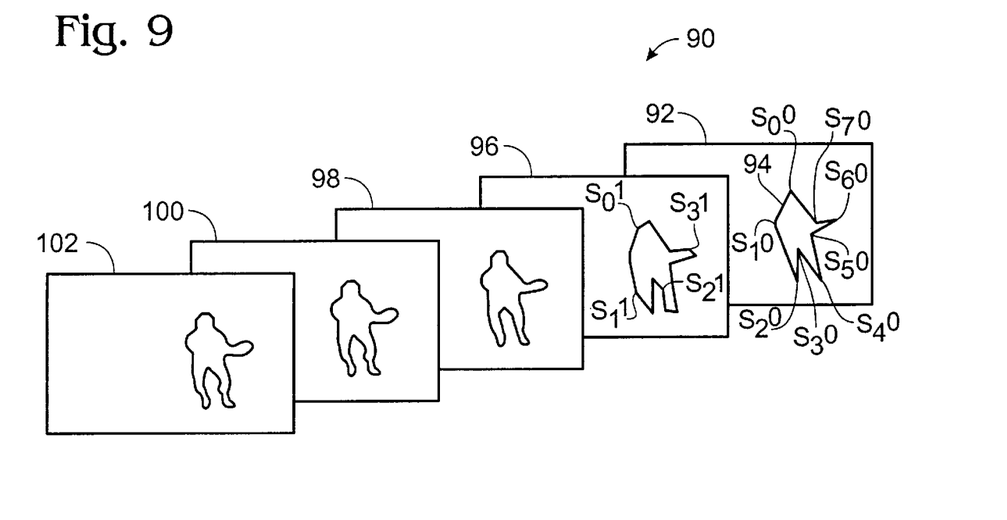
FIG. 9 is a schematic representation of the hierarchical layers used in the method of FIG. 8.

Hierarchical representation is created by selecting multiple set of vertices where each set constitutes a layer in the hierarchical representation, which is referred to herein as hierarchical vertex selection, 82. Representation by larger number of vertices is obtained by combining the vertices from the higher levels. FIG. 9 depicts a five-layer representation of an example shape, shown generally at 90. The base layer (Layer 0) 92 has eight vertices ($S_00$–$S_70$) which capture the most salient feature of the shape, 94. The next most salient layer, Layer 1 (96), has four vertices ($S_01$–$S_31$). The representations in the drawing depict the layers combined in a reconstructed condition, so that the effect of adding more vertices is seen as the shape gains definition. Layer 2 (98) and layer 3 (100) have their own sets of vertices which add additional features to the shape, and so on, until the relatively smooth representation of Layer 4 (102) may be seen to depict the outline of a tennis player. The vertices in any designated layer comprise a set of vertices, i.e., Layer 0 has a collection of vertices in Set 1; Layer 2 has a collection of vertices in Set 2, and so on. As depicted in FIG. 9, each layer is shown with the vertices from that layer's set as well as the vertices from the layer sets of more salient layers.

The Vertex-Based Hierarchical Shape Representation method facilitates shape recognition and allows reconstruction of an image to varying degrees of fineness, i.e., a representation of the shape of the video object using only those contour points located in Layer 0 will result in a coarse representation when the base layer vertices are decoded and the object is reconstructed. The incorporation of vertices from less salient layers will require reconstruction using more bits, and will result in a representation of higher quality.

There are various different representations of shapes. Binary shape map 72 is a possible representation by itself. Representation by the shape contour 78, and specifically by vertices on the contour ($S_0$–$S_n$), readily provides a description of the object shape and may be directly used in manipulation of the object.

A hierarchical vertex-based representation is advantageous in many applications. For instance, it facilitates fast browsing through content based image and video databases. The image objects may be reconstructed with their shapes represented with the least number of vertices that are on the other hand most salient. The user may quickly decide to skip to another candidate, when the most salient representation of the shape does not fit what the user is looking for. The user will then consider the next candidate or modify the query. Otherwise, the user will request a reconstruction of the object using additional layers of its shape information to make a decision to retrieve the object in its entirety.

Shape coding efficiency may be increased using motion-compensated predictive coding of vertices. In the case of the proposed hierarchical representation, vertices at the current frame are predicted from the previous frame using those that belong to the same hierarchy layer.

Thus a method of generalized content-scalable shape representation and coding has been disclosed. Variations and modifications may be made thereto without departing from the scope of the invention as defined in the appended claims.

We claim:

1. A method of content-scalable, shape representation and coding for use on an image object, comprising:

forming a binary bitmap of the shape of an image object;

dividing the binary bitmap into a macroblock array;

defining important segments of the shape of an image object and defining non-important segments of the shape of the image object, wherein an important segment is a segment that surrounds a portion of the image object to be represented and coded with greater accuracy than an unimportant segment;

coding an important segment with more bits than are used to code a non-important segment;

forming a multi-resolution representation of each macroblock, wherein the multi-resolution representations range from a coarse resolution through successive layers of finer resolutions, and wherein the number of finer resolution representations is controlled for each macroblock on the basis of the visual importance of the region represented by the macroblock.

2. The method of claim 1 which includes coding the important parts of a shape using relatively more hierarchical layers of bit maps at different resolutions for each macroblock.

3. The method of claim 1 which includes, for each macroblock, selecting a total number of layers; and selecting a saliency parameter for each layer and for each macroblock.

4. The method of claim 3 which includes associating a scalability indicator with each macroblock.

5. The method of claim 4 which includes coding unimportant macroblocks only in a single layer.

6. A method of content-scalable, shape representation and coding for use on an image object, comprising:

representing the shape of the image object using plural hierarchical layers, wherein each layer represents the shape of the image object at a different level of accuracy;

determining important segments and non-important segments of an image object shape from the image object, wherein an important segment is a segment that surrounds a portion of the image object to be represented and coded with the highest accuracy;

defining a contour of interest about the periphery of the important segment and using a relatively larger number of vertices to define the contour of interest;

selecting, for important segments of an image object shape, a total number of layers for each segment, and selecting, for non-important segments, a lesser number of layers than for the important segments;

selecting a saliency parameter for each layer and for each segment; and coding the important segment of the image object with more bits allocated thereto than to the non-important segments of the image object.

7. The method of claim 6 which includes dividing the image object shape into macroblocks; and associating a scalability indicator with each macroblock.

8. The method of claim 7 which includes coding unimportant macroblocks only in a single layer.

9. The method of claim 1 wherein the important segment is defined as that segment surrounding an object selected by the user.

10. The method of claim 6 wherein the important segment is defined as that segment surrounding a head.

* * * * *